(12) United States Patent
Yamazaki

(10) Patent No.: US 7,661,752 B2
(45) Date of Patent: Feb. 16, 2010

(54) UNDER COVER

(75) Inventor: Akihito Yamazaki, Zama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 71 days.

(21) Appl. No.: 11/819,023

(22) Filed: Jun. 25, 2007

(65) Prior Publication Data

US 2008/0018136 A1  Jan. 24, 2008

(30) Foreign Application Priority Data

Jul. 18, 2006  (JP)  ............... 2006-195858

(51) Int. Cl.
*B62D 35/02* (2006.01)
*B62D 35/00* (2006.01)

(52) U.S. Cl. .............. 296/180.1; 296/193.07; 296/204

(58) Field of Classification Search .............. 296/180.1, 296/187.08, 193.07, 204, 184.1
See application file for complete search history.

(56) References Cited

U.S. PATENT DOCUMENTS

| 2,126,607 | A | * | 8/1938 | Boehner | ............... 280/797 |
| 3,110,518 | A | * | 11/1963 | Wessells | ............... 296/204 |
| 3,419,303 | A | * | 12/1968 | Eggert, Jr. et al. | ............... 296/204 |

FOREIGN PATENT DOCUMENTS

| CA | 1 156 293 A1 | 11/1983 |
| DE | 198 40 303 A1 | 3/2000 |
| EP | 0 888 956 A1 | 1/1999 |
| JP | 2001-018851 A | 1/2001 |
| JP | 2005-324762 A | 11/2005 |
| WO | WO 02/090172 A2 | 11/2002 |

\* cited by examiner

*Primary Examiner*—Glenn Dayoan
*Assistant Examiner*—Melissa A Black
(74) *Attorney, Agent, or Firm*—Foley & Lardner LLP

(57) ABSTRACT

An under cover for covering a base face of a vehicular body, includes: 1) a dent part; and 2) a protruding part. The dent part and the protruding part are formed alternately in series on a lower face of the under cover in at least a forward-rearward direction of a vehicle. The dent part and the protruding part have a cross section formed into a serial curved face.

13 Claims, 4 Drawing Sheets

UNDER COVER

BACKGROUND OF THE INVENTION

1. Field of the Invention

The present invention relates to an under cover for covering a base face of a vehicular body.

2. Description of the Related Art

Japanese Patent Application Laid-Open No 2001-18851 (=JP2001018851) discloses a conventional front under cover 4 for covering a lower front side of an engine room.

The conventional front under cover 4 is made of a plate member which is flat. The plate member has a lower face including a plurality of protrusions 7 at certain intervals. In plan view, the protrusions 7 each have a profile in a substantially cannon shot form with a circular front side and a rectangular rear side. In addition, the protrusions 7 rectify an air flowing below the lower face of the front under cover 4.

However, the under cover 4 has a flat face between the protrusions 7. Thereby, the protrusion 7 and the flat face are angled at a boundary therebetween. The boundary is likely to be bent, and therefore becomes sensitive to a breakage input such as a road surface interference and the like. Moreover, the flat face lowers rigidity of the under cover 4, thus causing such inconveniences as allowing a traveling wind to vibrate the under cover 4 and the like.

SUMMARY OF THE INVENTION

It is therefore an object of the present invention to provide an under cover which is resistive to a breakage input such as a road surface interference and the like and which is not vibrated by a traveling wind.

According to an aspect of the present invention, there is provided an under cover for covering a base face of a vehicular body, comprising: 1) a dent part; and 2) a protruding part, the dent part and the protruding part being formed alternately in series on a lower face of the under cover in at least a forward-rearward direction of a vehicle, the dent part and the protruding part having a cross section formed into a serial curved face.

The other object(s) and feature(s) of the present invention will become understood from the following description with reference to the accompanying drawings.

DESCRIPTION OF THE PREFERRED EMBODIMENTS

Hereinafter, an under cover of a vehicular body under the present invention is to be set forth, referring to drawings.

For ease of understanding, the following description will contain various directional terms, such as left, right, upper, lower, forward, rearward and the like. However, such terms are to be understood with respect to only a drawing or drawings on which the corresponding part of element is illustrated.

First Embodiment

Figure 1:
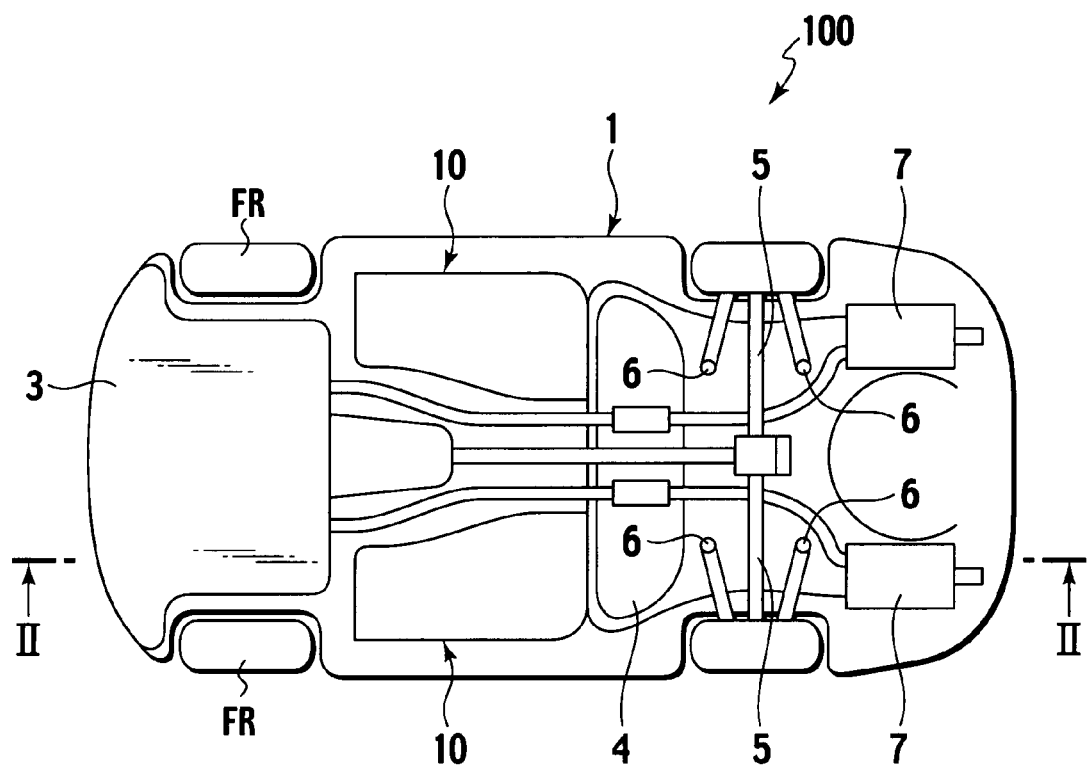
FIG. 1 is a schematic bottom view of a vehicular body under the present invention.
Figure 2:
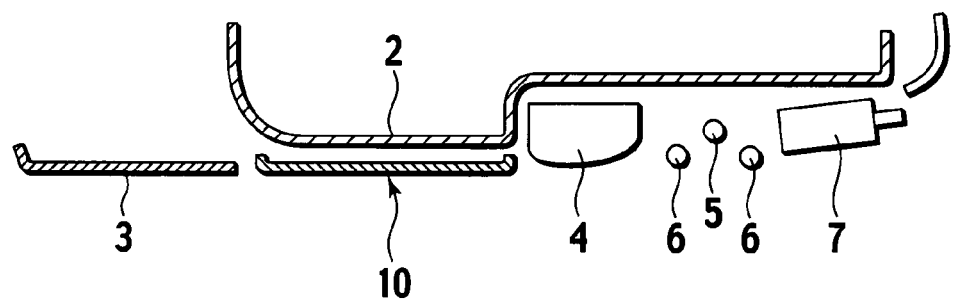
FIG. 2 is a cross sectional view taken along the line II-II in FIG. 1.

In FIG. 1 and FIG. 2, there are provided i) an under cover 10 (otherwise referred to as "floor under cover") for covering a floor panel 2 which is a base face of a vehicular body 1, ii) an engine under cover 3, iii) a fuel tank 4, iv) a drive shaft 5, v) a suspension link 6, and vi) a muffler 7, according to a first embodiment of the present invention. Relative to a road surface 15, the under cover 10 is positioned substantially as high as the engine under cover 3 and the suspension link 6.

Hereinafter, FIG. 1 and FIG. 2 are applicable likewise to a second embodiment to be set forth afterward.

Figure 3:
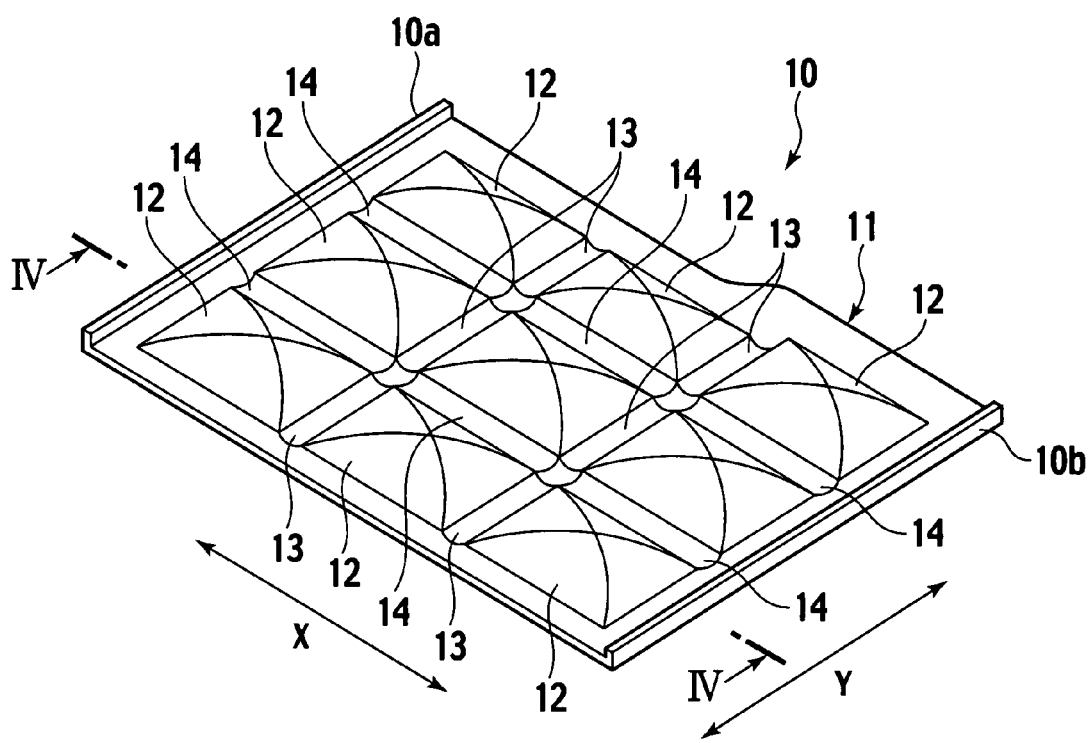
FIG. 3 is a perspective view of an under cover, according to a first embodiment of the present invention.
Figure 4:
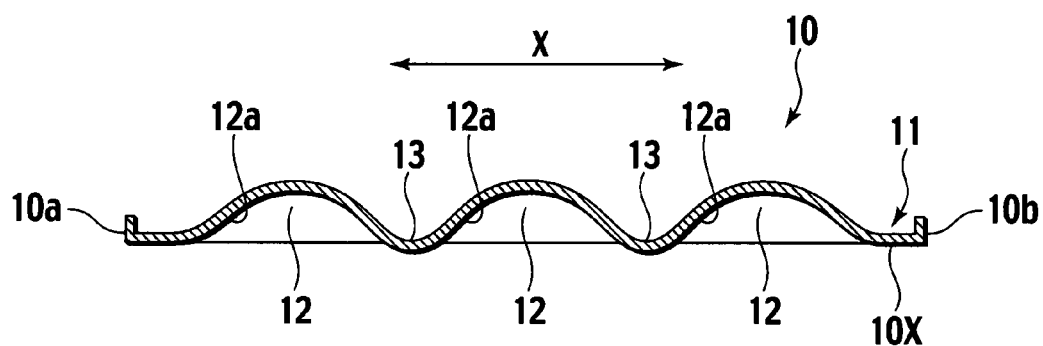
FIG. 4 is a cross sectional view taken along the line IV-IV in FIG. 3, according to the first embodiment of the present invention.

As shown in FIG. 3, the under cover 10 is formed with a flat plate body 11. As shown in FIG. 3 and FIG. 4, dent parts 12 and protruding parts 13 are formed alternately on the plate body 11 in a forward-rearward direction (X-direction) of a vehicle 100.

The dent part 12 dents upward (front side), while the protruding part 13 protrudes downward (road surface 15 side). In addition, an inner face 12a of the dent part 12 is formed substantially into a hemisphere. Moreover, the protruding part 13 has a curved cross section. Thereby, as shown in FIG. 4, the dent parts 12 and the protruding parts 13 are formed gently in series, forming a wavy cross section (serial curved face). Relative to the road surface 15, a lower face of the protruding part 13 is positioned substantially as high as the engine under cover 3.

With the above structure, a traveling resistance (otherwise referred to as "air resistance") is decreased.

Relative to an irregularity (protruding part and dent part) of the engine under cover 3, an irregularity (protruding part and dent part) of the under cover 10 (i.e., front view under cover or floor under cover) is smaller, thereby further decreasing the traveling resistance.

Herein, the lower face of the protruding part 13 may be positioned higher than the engine under cover 3.

Likewise, the dent parts 12 and protruding parts 14 are formed alternately in a widthwise direction (Y-direction) of the vehicle 100. The protruding part 14 protrudes downward (road surface 15 side) and has a curved cross section. Thereby, as shown in FIG. 3, the dent parts 12 and the protruding parts 14 are formed gently in series. Relative to the road surface 15, a lower face of the protruding part 14 is positioned substantially as high as the engine under cover 3.

Herein, the lower face of the protruding part 14 may be positioned higher than the engine under cover 3.

Moreover, the plate body 11 has a bent part 10a and a bent part 10b which are bent upwardly, respectively, at a front end and a rear end of the plate body 11.

Figure 5:
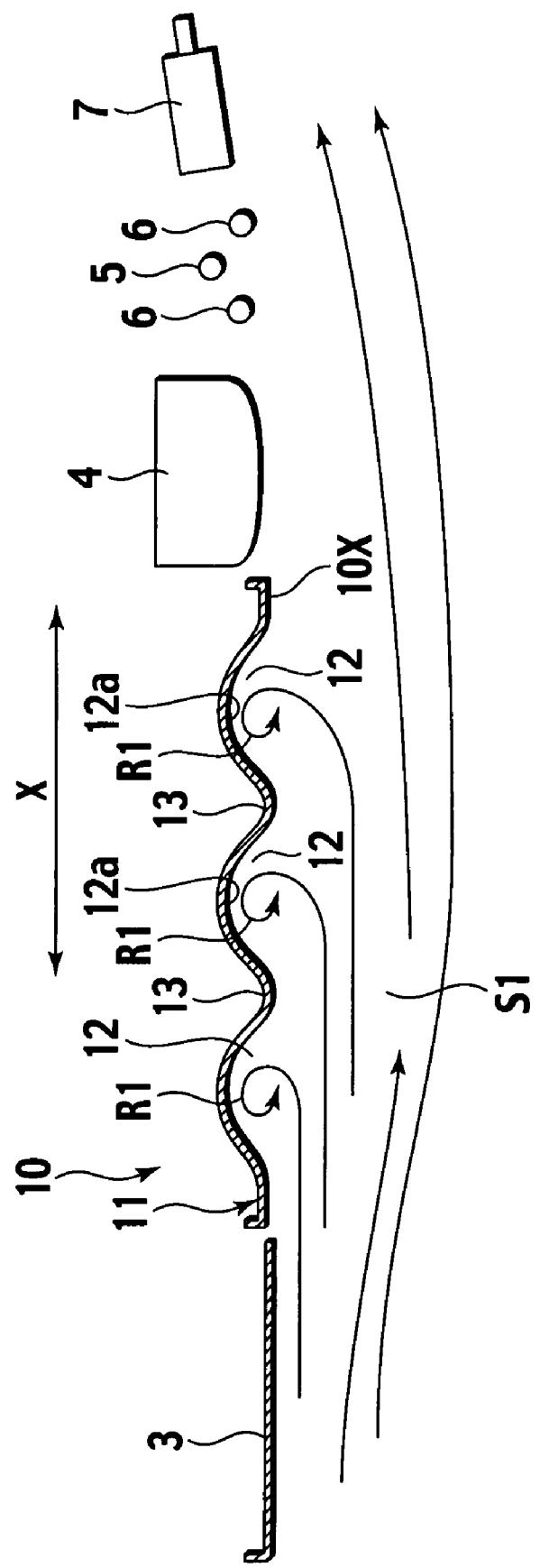
FIG. 5 explains the under cover relative to an air flow.

With the under cover 10 having the above structure according to the first embodiment, as shown in FIG. 5, a small turbulence R1 occurs to an inner part of the dent part 12, and a turbulence layer S1 attributable to the turbulence R1 is formed substantially entirely below a lower face 10X of the under cover 10. The turbulence layer S1 allows an entire air flow to be spaced apart from the lower face 10X of the under cover 10. Therefore, the traveling resistance adjacent to the lower face 10X of the under cover 10 is further decreased, thus increasing speed of the air flow.

That is, the air resistance of the under cover 10 is decreased, in other words, decreasing a load applied to the under cover 10, thereby preventing the under cover 10 from being vibrated by a traveling wind.

Moreover, the entire air flow is spaced apart from the lower face 10X of the under cover 10, preventing the traveling wind from directly abutting on the suspension link 6, thus suppressing the air resistance of the vehicle 100.

Moreover, the dent parts 12 and protruding parts 13 of the under cover 10 are formed gently in series, decreasing varied rigidity in the serial direction, thus securing high face rigidity. Moreover, even when a road surface interference occurs to the under cover 10, the dent parts 12 and the protruding parts 13 formed gently in series can prevent deformation of the under cover 10. That is, the under cover 10 is resistant to a breakage input by the road surface interference and the like.

Moreover, the inner face 12a having the hemispherical configuration increases rigidity of the dent part 12, thus further preventing the under cover 10 from being vibrated by the traveling wind. This prevents deteriorated passenger comfort which may be caused by the vibration transmitted to the vehicular body 1.

Moreover, the thus improved face rigidity of the under cover 10 can have a thickness about ½ to ¾ a thickness necessary for the same face rigidity brought about by an ordinary under cover.

According to first embodiment, the dent parts 12 and the protruding parts 14 are formed alternately in the widthwise direction (Y-direction) of the vehicle 100, thus bringing about a like effect against a lateral wind (cross wind or beam wind).

Second Embodiment

Figure 6:
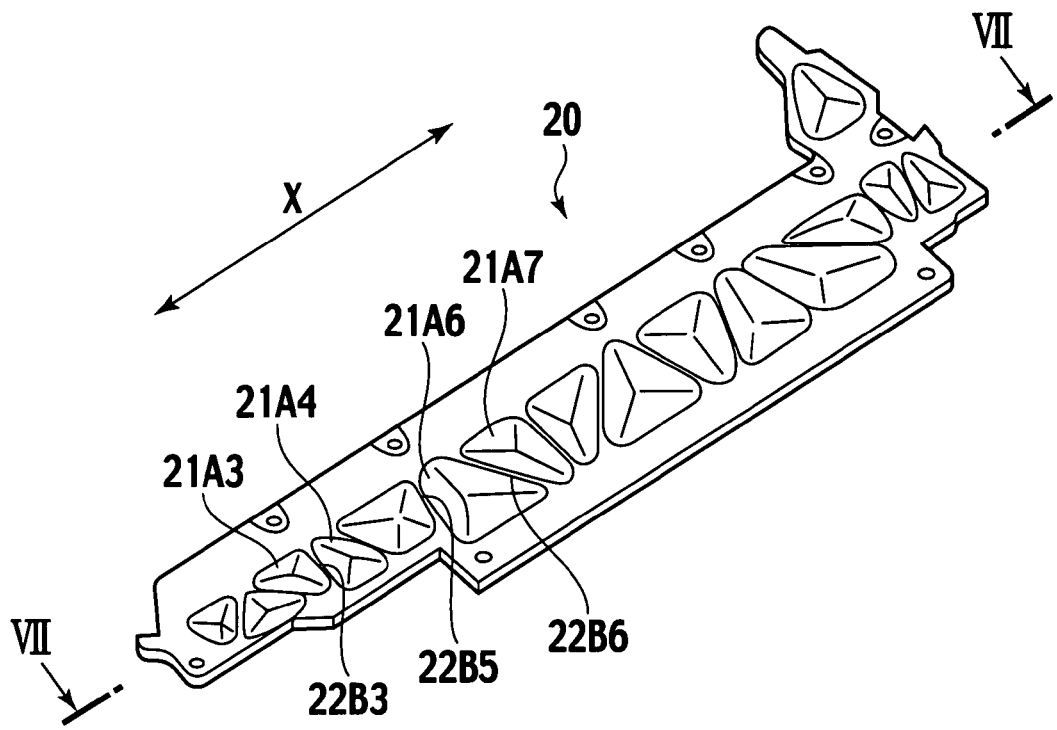
FIG. 6 is a perspective view of an under cover, according to a second embodiment of the present invention.
Figure 7:
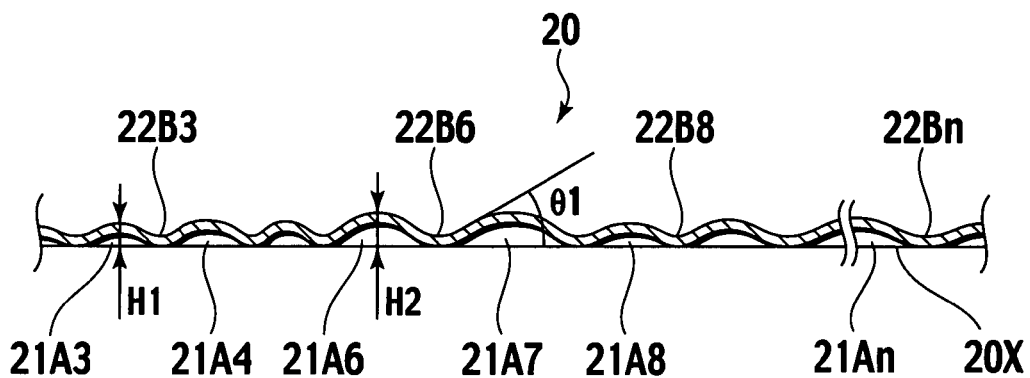
FIG. 7 is a cross sectional view taken along the line VII-VII in FIG. 6, according to the second embodiment of the present invention.

FIG. 6 and FIG. 7 show an under cover 20, according to a second embodiment of the present invention. The under cover 20 is so configured as to cover from a front wheel FR's side of the vehicle 100 to a base part of the fuel tank 4 (refer to FIG. 1).

The under cover 20 has a single row including dent parts 21An and protruding parts 22Bn formed alternately in the forward-rearward direction (X-direction) of the vehicle 100.

In the under cover 20, a step difference between a dent part 21A3 and a protruding part 22B3, that is, a minimum step difference H1 is about 5 mm, while a step difference between a dent part 21A6 and a protruding part 22B6, that is, a maximum step difference H2 is about 30 mm. Moreover, a slope angle θ1 of an inner face of the dent part 21A7 according to the second embodiment is preferably from 10° to 20°. However, the slope angle θ1 of 5° to 45° according to the second embodiment can bring about an effect like that brought about according to the first embodiment.

The present invention has been applied to the under cover for covering the floor panel 2. The present invention is, however, not limited to the above limitation. For example, the engine under cover 3 and the like disposed below the vehicular body 1 (see FIG. 1) are also allowed to have the structure under the present invention. Moreover, as a matter of course, the under covers 10, 20 each can be varied in design within a range not deviated from the scope of the present invention.

This application is based on a prior Japanese Patent Application No. P2006-195858 (filed on Jul. 18, 2006 in Japan). The entire contents of the Japanese Patent Application No. P2006-195858 from which priority is claimed are incorporated herein by reference, in order to take some protection against translation errors or omitted portions.

The scope of the present invention is defined with reference to the following claims.

What is claimed is:

1. An under cover for covering a base face of a vehicular body, comprising:
a dent part; and
a protruding part, the dent part and the protruding part being formed alternately in series on a lower face of the under cover in at least a forward-rearward direction of a vehicle, the dent part and the protruding part having a cross section formed into a serial curved face,
wherein relative to a road surface, the protruding part is positioned substantially as high as or higher than another under cover in a forward position of the under cover in the forward-rearward direction of the vehicle;
wherein the under cover is configured such that, when a small turbulence occurs in an inner part of the dent part and a turbulence layer attributable to the turbulence is formed substantially entirely below the lower face of the under cover, the turbulence layer allows an entire air flow to be spaced apart from the lower face of the under cover; and
wherein the under cover has a plurality of dent parts and protruding parts formed alternately in the forward-rearward direction of the vehicle such that a continuously wavy surface is formed.

2. The under cover according to claim 1, wherein relative to the road surface, the protruding part is positioned substantially as high as a suspension link in a rearward position of the under cover.

3. The under cover according to claim 1, wherein the dent part has an inner face formed substantially into a hemisphere.

4. The under cover according to claim 1, wherein the dent part and another protruding part are formed alternately in a widthwise direction substantially perpendicular to the forward-rearward direction of the vehicle.

5. The under cover according to claim 1, wherein the under cover is a floor under cover disposed below the base face which is a floor panel of the vehicular body.

6. The under cover according to claim 1, wherein the under cover is formed with a plate body having a first bent part and a second bent part which are bent upwardly, respectively, at a front end and a rear end of the plate body in the forward-rearward direction of the vehicle.

7. The under cover according to claim 1, wherein a minimum step difference between one of the dent parts and one of the protruding parts is about 5 mm, and
wherein a maximum step difference between another of the dent parts and another of the protruding parts is about 30 mm.

8. The under cover according to claim 1, wherein a slope angle of an inner face of still another of the dent parts is from 5° to 45°.

9. The under cover according to claim 8, wherein the slope angle of the inner face of the still another of the dent parts is from 10° to 20°.

10. The under cover according to claim 1, wherein the another under cover is an engine under cover in a forward position in the forward-rearward direction of the vehicular body.

11. The under cover according to claim 1, wherein the dent parts and the protruding parts formed alternately in series on the lower face of the under cover form the continuously wavy surface without one or more horizontal flat surfaces being formed therebetween.

12. The under cover according to claim 1, further comprising a plurality of dent parts and protruding parts formed alternately in a widthwise direction substantially perpendicular to the forward-rearward direction of the vehicle such that a continuously wavy surface is formed.

13. The under cover according to claim 12, wherein the plurality of dent parts and protruding parts formed alternately in the widthwise direction form the continuously wavy surface without one or more horizontal flat surfaces being formed therebetween.

* * * * *